(12) United States Patent
Callhoff et al.

(10) Patent No.: US 10,457,024 B2
(45) Date of Patent: Oct. 29, 2019

(54) COMPOSITE MATERIAL WITH COATING MATERIAL

(71) Applicant: MEHLER TEXNOLOGIES GMBH, Hueckelhoven (DE)

(72) Inventors: Christian Franz Callhoff, Aachen (DE); Ellen Keulen, Heinsberg (DE); Carina Erdmann, Hueckelhoven (DE)

(73) Assignee: MEHLER TEXNOLOGIES GMBH, Huckelhoven (DE)

( * ) Notice: Subject to any disclaimer, the term of this patent is extended or adjusted under 35 U.S.C. 154(b) by 109 days.

(21) Appl. No.: 15/381,950

(22) Filed: Dec. 16, 2016

(65) Prior Publication Data
US 2017/0182752 A1    Jun. 29, 2017

Related U.S. Application Data

(63) Continuation of application No. 13/813,457, filed as application No. PCT/EP2011/063464 on Aug. 4, 2011, now Pat. No. 9,555,442.

(51) Int. Cl.
*B32B 27/32* (2006.01)
*B29C 43/24* (2006.01)
(Continued)

(52) U.S. Cl.
CPC ............ *B32B 27/32* (2013.01); *B05D 3/12* (2013.01); *B29C 43/24* (2013.01); *B29C 43/28* (2013.01);
(Continued)

(58) Field of Classification Search
CPC ........... B32B 5/12; B32B 5/024; B32B 27/12; B32B 27/32
See application file for complete search history.

(56) References Cited

U.S. PATENT DOCUMENTS 4,315,965 A    2/1982  Mason et al.
4,702,948 A *  10/1987 Sieber-Gadient ......... C09J 7/21
                                                              428/172
(Continued)

FOREIGN PATENT DOCUMENTS

DE    20 2009 007356 U1    10/2009
EP       0 356 930 A2        3/1990
(Continued)

OTHER PUBLICATIONS

Dec. 23, 2011 International Search Report issued in Application No. PCT/EP2011/063464.
(Continued)

*Primary Examiner* — Jeremy R Pierce
(74) *Attorney, Agent, or Firm* — Oliff PLC

(57) ABSTRACT

The invention relates to a composite material composed at least of one carrier material, wherein the carrier material is coated on a first surface with a first coating material and on a second surface with a second coating material, wherein the composite material has links of coating material which run from the first surface of the carrier material to the second surface of the carrier material, wherein links of coating material start from 1% to 90% of at least one of the surfaces of the carrier material. The invention further relates to a method for producing a composite material of this type.

15 Claims, 5 Drawing Sheets

(51) Int. Cl.
*B29C 43/28* (2006.01)
*B32B 37/04* (2006.01)
*B05D 3/12* (2006.01)
*B32B 1/02* (2006.01)
*B32B 5/02* (2006.01)
*B32B 5/12* (2006.01)
*B32B 27/12* (2006.01)
*B32B 37/15* (2006.01)
*B32B 37/02* (2006.01)
*B32B 37/20* (2006.01)
*B32B 37/00* (2006.01)

(52) U.S. Cl.
CPC ............... *B32B 1/02* (2013.01); *B32B 5/024* (2013.01); *B32B 5/12* (2013.01); *B32B 27/12* (2013.01); *B32B 37/04* (2013.01); *B32B 37/15* (2013.01); *B32B 37/02* (2013.01); *B32B 37/203* (2013.01); *B32B 2037/0092* (2013.01); *B32B 2305/18* (2013.01); *B32B 2305/20* (2013.01); *B32B 2419/06* (2013.01); *B32B 2439/00* (2013.01); *Y10T 428/1366* (2015.01); *Y10T 442/2049* (2015.04)

(56) References Cited

U.S. PATENT DOCUMENTS

| | | | | |
|---|---|---|---|---|
| 6,042,882 | A * | 3/2000 | Deeb | B32B 7/12 442/62 |
| 6,054,178 | A * | 4/2000 | Howells | B29C 43/28 442/62 |
| 6,533,884 | B1 | 3/2003 | Mallik | |
| 2002/0125037 | A1* | 9/2002 | Kulper | H01B 7/1855 174/117 A |
| 2005/0020168 | A1* | 1/2005 | Pott | B32B 5/26 442/268 |
| 2005/0106965 | A1 | 5/2005 | Wevers et al. | |
| 2005/0205743 | A1* | 9/2005 | Scott | A47G 23/03 248/346.11 |
| 2007/0074486 | A1* | 4/2007 | Stroppiana | E01C 9/086 52/782.1 |
| 2007/0194482 | A1 | 8/2007 | Douglas et al. | |
| 2009/0291298 | A1 | 11/2009 | Robert et al. | |
| 2009/0297794 | A1 | 12/2009 | Lin | |
| 2009/0324905 | A1 | 12/2009 | Welch et al. | |
| 2012/0178323 | A1* | 7/2012 | Rockenfeller | F41H 5/0464 442/86 |

FOREIGN PATENT DOCUMENTS

| | | |
|---|---|---|
| EP | 2 123 444 A1 | 11/2009 |
| WO | 00/059723 A1 | 10/2000 |
| WO | 2011/045321 A1 | 4/2011 |
| WO | 2011/045325 A1 | 4/2011 |

OTHER PUBLICATIONS

Oct. 23, 2015 Office Action issued in U.S. Appl. No. 13/813,457.
May 19, 2016 Office Action issued in U.S. Appl. No. 13/813,457.

* cited by examiner

COMPOSITE MATERIAL WITH COATING MATERIAL

CROSS-REFERENCE TO RELATED APPLICATIONS

This is a Continuation of application Ser. No. 13/813,457 filed Jan. 31, 2013 (issued as U.S. Pat. No. 9,555,442 on Jan. 31, 2017), which in turn is a national stage entry of PCT/EP2011/063464 filed Aug. 4, 2011, which claims priority to EP 11161918.5 filed Apr. 11, 2011, and EP 10173065.3 filed Aug. 17, 2010. The disclosure of the prior applications is hereby incorporated by reference herein in its entirety.

The invention relates to a composite material which is composed at least of one carrier material. The carrier material is coated on a first surface with a first coating material and on a second surface with a second coating material. The invention also relates to a method for producing a composite material of this type.

Coated composite materials are generally known. Composite materials in general have a carrier material, which is coated on one side or on both sides. Depending on the carrier material and coating material used, however, a integral adhesion between the carrier material and the coating material can be achieved only with difficulty. As a rule, adhesion promoters are used. The carrier material can thereby be coated with the aid of a chemical process, for example. To this end, as a rule an adhesion promoter is applied onto the carrier material and subsequently a coating is carried out. Through the adhesion promoter the carrier material, the coating and the adhesion promoter together form a composite material. One disadvantage of the use of adhesion promoters is that constituents of the adhesion promoter can be detached from the composite material. Moreover, the adhesion promoter as a rule must be specially adjusted to the carrier material used and the coating material used. Quick production changes are therefore not possible.

Alternatively to the use of an adhesion promoter, the carrier material can also be prepared, for example, by a so-called corona treatment in order to improve the adhesion between the carrier material and the coating material. However, the disadvantage with a corona treatment of this type is that the effect of the treatment is only brief, so that the coating must take place immediately after the corona treatment in terms of time. This makes the production process inflexible and expensive. Overall, the previously suggested methods for generating an adhesion between the carrier material and the coating material are complex and expensive.

Such disadvantages of the products and their production methods have an effect in particular in the case of large-area applications of coated composite materials, such as, for example, with applications in the field of textile architecture. Applications in the field of textile architecture are, e.g., composite materials or membranes and in particular coated woven fabric for canopies, intermediate ceilings, false ceilings, factory buildings, inflatable structures or marquees, or also containers, silos, tanks, etc. Above all in the case of large-area applications of this type, the ultimately important factor with respect to the extreme tensile forces and compressive force, for example, with constructions under tension, is a high tear resistance, in particular a high tear propagation resistance and a good sealability of the webs, for which a high adhesive strength between the textile carrier and coating is an important prerequisite.

A corona treatment is very complex, particularly in the production, e.g., of large-area coated woven fabric. On the other hand, with large-area applications in the field of textile architecture the migration of adhesion promoters and possibly further additives plays an important role, especially as the coated composite materials with applications of this type are also sometimes exposed in particular to aggressive environmental and light impacts. With applications in the field of food technology, such as, for example, with containers for food of a coated woven fabric, it can have a negative impact if, e.g., an adhesion promoter or constituents of an adhesion promoter migrate to the surface of the coated woven fabric and from there are emitted to the food.

The object of the present invention was therefore to provide a composite material, in particular also for large-area applications or also for applications in the field of food technology, with which a good adhesion between the carrier material and the coating material is ensured without it exhibiting the disadvantages described above.

The object is attained through a composite material, at least comprising a carrier material, wherein the carrier material is coated on a first surface with a first coating material and on a second surface with a second coating material, wherein the composite material has links of coating material which run from the first surface of the carrier material to the second surface of the carrier material, wherein a starting area of the links, which starts from the first surface of the carrier material, accounts for 1% to 90% of the area of the first surface.

Through the first coating material a first coating layer is produced on the first surface of the carrier material, which coating layer is advantageously connected by the links to a second coating layer (formed by the second coating material). The carrier material consequently lies between the two coating layers and is penetrated at least in part by the coating material (through the links). Carrier material and coating material are hereby integrally intermixed with one another, without additional adhesives, adhesion promoters or corona treatments being necessary. Accordingly, the integral connection of carrier material and coating material is also obtained for composite materials that are free from adhesives or adhesion promoters, for example. In addition, the invention has the advantage that the carrier material is stabilized inside the carrier material by the links. For example, the carrier material is prevented by the links from shrinking or crimping, whereby, for example, the dimensions of the carrier material (for example, the length or width of the carrier material) also remain stabilized.

As already mentioned, the starting area of the links starting from the first surface of the carrier material accounts for 1% to 90% of the area of the first surface of the carrier material. Preferably, the starting area of the links starting from the first surface of the carrier material accounts for 5% to 70% of the area of the first surface of the carrier material. Particularly preferably, the starting area of the links starting from the first surface of the carrier material accounts for 10% to 50% of the area of the first surface of the carrier material and very particularly preferably 25% to 40%. The percentages thereby relate to the area percentage (and not to the volume percentage) and the area on which it is based is the surface of the carrier material that lies parallel to the main extension plane of the carrier material. The starting area of the links is understood to be the area of each link, which projects straight into the carrier material. If, for example, a carrier material is coated such that links are produced and subsequently the coating material is completely removed from the previously coated surface, the links produced are visible in the plan view as points. The visible points form the starting area of the links, since the links start therfrom. The starting area of the links is preferably measured in a penetration depth of 0.1 mm inside the carrier material. Naturally, the starting area of the webs is produced by summation of the individual starting areas of each individual link. Preferably, the links are uniformly distributed over the area of the carrier material, i.e., no larger areas occur without links or with a reduced number of links.

The first and the second surface of the carrier material lie approximately parallel to the main extension plane of the composite material and opposite one another. The plane in which the starting area of the links is measured, likewise lies approximately parallel to the main extension plane of the composite material and between the two surfaces of the carrier material.

Preferably, at least 20 and up to 100% of the links area embodied such that they extend from the first surface of the carrier material to the second surface of the carrier material. Particularly preferably at least 40% and very particularly preferably at least 50% of all links extend from the first surface of the carrier material to the second surface of the carrier material. The links that extend from the first surface of the carrier materiel to the second surface of the carrier material preferably connect the first coating layer to the second coating layer. Consequently, the link runs starting from the first coating layer inside the carrier material to the second coating layer and is thereby also connected to the second coating layer.

45 to 100% of the first surface of the carrier material and/or the second surface of the carrier material is preferably coated by the first and/or second coating material. Particularly preferably, 60 to 95%, very particularly preferably 70 to 90% of the first surface of the carrier material and/or the second surface of the carrier material is coated by the first and/or second coating material.

Preferably, the carrier material is composed of at least one woven fabric, a knitted fabric, a gauze, a lattice or a non-woven fabric. The carrier material is very particularly preferably a woven fabric, wherein the woven fabric preferably has a twill weave, a linen weave, basket weave or a satin weave. The carrier material can be single-ply or multi-ply, wherein the carrier material in single ply or multi-ply can have the above-mentioned weaves. For example, the carrier material can have a multi-ply structure and be composed of at least two woven fabric plies or one fabric ply and a gauze ply.

The term fiber covers continuous fibers as well as staple fibers or short fibers. The fibers can belong to a multifilament yarn as well as to a monofilament yarn. In a preferred embodiment of the composite material according to the invention the fibers of the carrier material are those of polyester, polyolefins, such as e.g., polyethylene, polytetrafluorethylene, aromatic polyaramides or carbon fibers. High-tenacity fibers such as, e.g., aramid fibers are particularly preferred which can be obtained, e.g., under the trade names Twaron (Teijin Aramid) or Kevlar (Du Pont), or high-tenacity polyethylene fibers such as can be obtained, e.g., under the trade names Dyneema (DSM B.V.) or Spectra (Honeywell International). In particular those fibers should also be mentioned which, although they have a high strength, have only a limited temperature stability, such as, e.g., the high-tenacity polyethylene fibers which already change from a partially crystalline into an amorphous state at temperatures above approx. 140° C. and thereby lose their high strength.

Preferably, the first coating layer and the second coating layer are composed of the same coating material. That means that the first coating material and the second coating material is the same material. As a coating material for the first coating layer and/or the second coating layer, polyvinyl chloride, polyolefin homopolymers, such as, for example, polyethylene or polypropylene, or polyolefin-copolymers, such as, e.g., metallocene plastomers, furthermore polyurethane, Alcryn, silicone, acrylate and/or any mixtures of the above-mentioned materials can be used. Particularly preferably the first and or the second coating layer is composed essentially completely of polyvinyl chloride, polyolefin homopolymers, polyolefin copolymers, such as, e.g., so-called metallocene plastomers and/or polyurethane. Metallocene plastomers are those plastomers that are produced with the use of metallocene catalysts. Plastomers are thereby materials that have thermoplastic properties as well as elastomeric properties. One example of a plastomer of this type is a special low-density polyethylene copolymer sold under the name Exact by Dexplastomers. Particularly preferred as coating are plastomers, which have a good strength and a good flexibility without additives such as, e.g., softening agents having to be added.

Particular advantageously in particular for applications in the field of textile architecture polyolefin copolymers i.e., metallocene plastomers with a high flexibility, are used are as coating material. In this case, the metallocene plastomers used as coating material preferably have a flexural modulus determined according to ISO 178 of no more than 50 Mpa and particularly preferably of no more than 30 Mpa. Excellently suited for uses in the field of textile architecture are octane-1 plastomers, which can be obtained under the trade name Exact 8210 (DEXPlastomers).

The first and/or the second coating layer can be structured in a single-layer or multi-layer manner (multiplayer structure). In the case of a multi-layer structure of the first and/or second coating layer, the coating layer (first and/or second coating layer) is composed of more than one layer. Each layer can thereby be composed of different coating materials or the layers are composed of the same coating material. Additionally or alternatively to this, the coating layer can also have an additional layer in the case of a multi-layer structure and in the case of a single-layer structure. The additional layer can be, for example, a protective layer for the coating layer, which is designed to protect the coating layer from humidity, fungal attack, insecticidal attack and/or dirt. The protective layer is preferably not composed of a normal coating material such as is used for the first and/or second coating layer. The varnishing of a coating layer, so that a lacquer layer is produced on the coating layer, is an example of a protective layer.

A coating layer that is essentially composed of only one material, is preferably composed of the cited material to 40%, particularly preferably over 70% and very particularly preferably over 95% of the cited material.

The first and/or the second coating layer can be flame-proofed and/or embodied in color. Furthermore, it is conceivable that the first and/or the second coating layer has particular haptic properties such as e.g. a structuring. Also particularly heat-conducting or heat-insulating properties are possible for the first and/or second coating layer.

Preferably, the links are embodied of coating material at openings in the carrier material. An opening means, for example, an interstice, which due to the fabric weave occurs regularly in a fabric as carrier material, for example, between the weft and warp threads with woven fabrics. In the case of a knitted fabric, such openings are, for example, the gaps between stitches that occur in the knitted fabric. In the case of a non-woven fabric, the openings occur through areas in the non-woven fabric in which the fibers lie less or not at all one on top of the other.

Preferably, the composite material according to the invention has a length in the range of 0.8 to 3.5 m and preferably in the range of 1 to 3.2 m in two directions perpendicular to one another of its flat extension. In the case of a web-shaped composite material with a running direction or production direction and a transverse direction such as, e.g., with a coated woven fabric, gauze etc., the extension in the transverse direction is then preferably in the range of 0.8 to 3.5 m and preferably in a range of 1 to 3.2 m. In the case of a coated woven fabric, e.g., the transverse direction corresponds to the direction of the weft threads. Applications in the field of textile architecture can be easily realized with such composite materials.

A further subject of the present invention is a method for producing a composite material. The method described below is suitable in particular for producing the composite material according to the invention. The method according to the invention for producing a composite material is a continuous method in which a first coating material is applied on the first surface of a web-shaped carrier material. A second coating material is applied on a second surface of the web-shaped carrier material. The temperature of the first coating material and/or the second coating material and the pressure during the application of the first and/or second coating material are selected such that the first coating material and/or the second coating material flows from the one surface of the web-shaped carrier material to the other surface of the carrier material through the web shaped carrier material and links are thereby formed inside the web-shaped carrier material, wherein the method is carried out such that a starting area of the links is formed, which starts from the first surface of the web-shaped carrier material and accounts for 1% to 90% of the area of the first surface. Preferably, the method is carried out such that the starting area of the links starting from the first surface of the carrier material accounts for 5% to 70% of the area of the first surface of the web-shaped carrier material and particularly preferably the starting area accounts for 10% to 50% of the area of the first surface of the web-shaped carrier material.

For the starting materials used in the present method as well as for the composite material to be produced by the method, the same definitions and statements apply, for example, to the carrier material or to the coating materials as already described in connection with the composite material according to the invention.

The first and/or the second coating material is applied in the present method by a calander onto the carrier material. Preferably, the first and/or the second coating material is applied to the carrier material by a melt roller calander.

For the purposes of the present invention, calandering means a process in which a melt or a paste of a polymer material above its softening temperature is guided through a nip of a system of several heated and polished rollers. During the calandering operation, a layer of the melts is produced (coating layer) and this coating layer in the melt state is preferably applied to a carrier material without an intermediate cooling. For the purposes of the present invention, melt thereby means on the one hand a polymer material that is above its melting temperature in a liquid state of matter. Furthermore, however, it is also understood to mean a polymer material that is above its softening temperature in a liquid, pasty state of matter. The latter is used, for example, for coating materials which, although they have a softening temperature, already degrade in the range of their melting temperature, such as is the case, for example, with coating materials based on softened polyvinyl chloride. Consequently, for the purposes of the present invention molten also means pasty or a molten state also means a pasty state. Thus for the purposes of the present invention a molten state of the first or second coating material means the state that the first or second coating material has at temperatures above its softening temperature.

In contrast to the calandering method, in a laminating process, for example, an already finished layer (e.g., a film) is applied by means of an adhesive. The embodiment of links inside a carrier material is not possible by means of a laminating process. Through the use of an already finished layer, that is, e.g., a film that is applied to a carrier material during a laminating process, this layer cannot penetrate into the carrier material such that links are formed, which can provide a connection between layer and carrier layer.

Within the scope of the present invention, calander or melt roller calander arrangements can be used, as they are used in principle in plastic processing, and which can have several rotating rollers or pairs of rollers lying parallel. The method of the present invention comprises the following process steps Furnishing a web-shaped carrier material in a melt roller calander arrangement, comprising a first and a second coating calander, Furnishing a first coating material and converting the first coating material into a molten state at a temperature above its softening temperature Producing a molten web of the first coating material Guiding the web of the first coating material in the molten state together with the web-shaped carrier material and on the first surface of the carrier material through the nip of the first coating calander, whereby the first coating material is applied to the first surface of the carrier material and, due to the pressure exerted in the nip of the first coating calander, the first coating material and the carrier material undergo a integral connection, Furnishing a second coating material and converting the second coating material into a molten state at a temperature above its softening temperature, Producing a molten web of the second coating material, Guiding the web of the second coating material in the molten state together with the web-shaped carrier material and on the second surface of the carrier material through the nip of the second coating calander, whereby the second coating material is applied to the second surface of the carrier material and, due to the pressure exerted in the nip of the second coating calander, the second coating material and the carrier material undergo a integral connection, wherein the temperature of the first coating material and/or the second coating material and the pressure in the nip of the first and/or second coating calander are adjusted such that the first coating material and/or the second coating material flows from the one surface of the carrier material to the other surface of the carrier material through the carrier material and links are thereby formed inside the carrier material and a starting area of the links is formed, which start from the first surface of the carrier material, wherein the starting area accounts for 1 to 90% of the area of the first surface.

In a further preferred embodiment of the method, the first coating material is converted into a molten state at a temperature above the softening temperature of the first coating material and, by guiding through the nip between the rotating rollers of a first heated pair of rollers, a plastic or molten web of the first coating material is produced. This web of the first coating material is transferred by means of one or more heated rollers into the nip of the first coating calander and, still in the molten state, together with the web-shaped carrier material and on the first surface of the carrier material is guided through this roller nip. Likewise a second coating material is converted into a plastic or molten state at a temperature above the softening temperature of the second coating material and by guiding through the nip between the rotating rollers of a second pair of heated rollers a plastic or molten web of the second coating material is produced. This web of the second coating material is transferred by means of one or more heated rollers into the nip of a second coating calander and, still in the plastic or molten state, together with the web-shaped carrier material and on the second surface of the carrier material is guided through this roller nip.

The rollers described above for the transfer of the web of the first or second coating material into the nip of the respective coating calander can preferably also be arranged in the form of at least one further pair of rollers, through the nip of which the web, still in the plastic or molten state, of the first or second coating material is guided and, in an advantageous embodiment of the method, is reduced in thickness. In a particularly preferred embodiment, the thickness of the web of the first or the second coating material is reduced in thickness via several pairs of rollers arranged one behind the other. Such arrangements of pairs of rollers can preferably be embodied as a three-roller, four-roller or five-roller calander, wherein the rollers can preferably be arranged in a Z-shape in the case of four-roller or five-roller calanders. Likewise, multiple-roller calanders in an I-arrangement, F-arrangement or L-arrangement are possible.

In a further advantageous embodiment of the method, a first coating material is converted into a molten state at a temperature above the softening temperature of the first coating material and by guidance through the nip between the rotating rollers of a first pair of heated rollers and optionally, as explained above, further pairs of rollers, a plastic or molten web of the first coating material is produced. The web of the first coating material is then transferred by means of a take-off roller to the first surface of the web-shaped carrier material and, still in the molten state, applied to the first surface of the carrier material before the web-shaped carrier material provided on its first surface with the first coating material subsequently transfers into the nip of the first coating calander and there is connected to the first coating material due to the pressure exerted in the nip of the first coating calander. Likewise, a second coating material is converted into a molten state at a temperature above the softening temperature of the second coating material and by guidance through the nip between the rotating rollers of a second pair of heated rollers and optionally, as explained above, further pairs of rollers, a plastic or molten web of the second coating material produced. The web of the second coating material is then transferred by means of a take-off roller onto the second surface of the web-shaped carrier material already coated on its first surface with the first coating material and, still in the molten state, applied to the second surface of the carrier material, before the web-shaped carrier material then provided on its second surface with the second coating material is subsequently transferred into the nip of a second coating calander and there, due to the pressure exerted in the nip of the second coating calander, is connected on its second surface with the second coating material.

In an advantageous embodiment of the method, the first coating calander and the second coating calander are identical, and the web-shaped carrier material is initially guided together with the web of the first coating material through the nip of a single coating calander, whereby the first coating material is applied to the first surface of the carrier material. In a subsequent step of the method, the web-shaped carrier material coated with the first coating material together with the web of the second coating material is guided through the nip of the only coating calander, whereby the second coating material is applied to the second surface of the carrier material.

In a further preferred embodiment of the method, the first and/or the second coating material in the molten state is fed directly into the nip of the first or second coating calander and then the molten web of the first or second coating material is produced in the nip. The web of the first or the second coating material runs together with the web-shaped carrier material through the nip of the first or second coating calander. In one embodiment, firstly the first coating material can be applied on the first surface of the carrier material in the nip of the first coating calander and subsequently the second coating material is applied on the second surface of the carrier material in the nip of the second coating calander.

In a further embodiment, the first and the second coating calander or the nip of the first coating calander and the nip of the second coating calander can be identical, wherein then the first coating material and the second coating material can be applied at the same time in the nip between the only coating calander on the first or second surface of the carrier material. Likewise, it is also possible that in the nip of the only coating calander firstly the web-shaped carrier material is coated on the first surface with the first coating material in the nip of the coating calander and subsequently the carrier material coated on one side is submitted to the process again and is coated on the second surface with the second coating material in the nip of the coating calander.

The method further also comprises variants and combinations of the method embodiments described above. For example, the web of the first coating material can be separately produced via a pair of heated rollers and then combined with the carrier material, while the web of the second coating material is produced in the nip of the coating calander. The coating of the web-shaped carrier material can thereby be carried out simultaneously on both sides of the carrier material or also in consecutive process steps.

The first or the second coating material can be fed, e.g., to an extruder and in the extruder heated to a temperature above the softening temperature, and the coating material converted into a homogenous melt. This melt, which, as has been explained, also means a paste above the softening temperature of the coating material, is then fed either to the nip of a pair of heated rollers or to the nip of the coating calander and the necessary web of the coating material is produced therefrom.

Within the scope of the present invention, the softening temperature means the so-called Vicat softening temperature VST, which is determined according to the DIN EN ISO 306 standard. We hereby revert to the VST/B50.

Preferably, the coating calander or calanders thus in the present method ensure the application of the first and/or the second coating material and also that at least one coating material (that is, the first or the second coating material) is pressed through the coating material and comes into contact with the first or the second coating material. After the application of the first coating material and the second coating material, the coated carrier material is drawn off from the last used coating calander and subsequently cooled e.g., by means of a cooling roller.

In a preferred embodiment of the method, the first and or the second coating material is pressed through the carrier material at least up to half of the distance between the first surface and the second surface. It is preferred thereby if the first and/or the second coating material is pressed through the carrier material at least up to two thirds of the distance between the first surface and the second surface. Very particularly preferably, the links to be formed are pressed completely through the carrier material.

It is advantageous if the first as well as the second coating material is pressed through the carrier material by calandering. Through the pressing of the first and/or the second coating material through the carrier material, preferably the first or the second coating material comes into contact with the respectively other coating material and the links are formed. Then the two coating layers are hereby connected to one another on the two top sides of the carrier material through the links of coating material, which go through the carrier material. In a special case, however, it can also be provided that links are produced when the first and/or the second coating material are not pushed so far into the carrier material that they are in contact with one another. For example, the first as well as the second coating material can be respectively pressed into the carrier material up to a third of the distance between the first surface and the second surface. The two coating materials are thus not in contact with one another and nevertheless an adhesion is produced between the coating material and the carrier material because the coating material engages in the carrier material.

The method according to the invention provides the advantage that high pressures can be applied in order to achieve a integral connection of carrier material and coating material. The method can hereby also be carried out with relatively high-viscosity melts of the coating material, which on the other hand means that the processing temperatures can remain relatively low. At the same time, the dwell times that are required in order to achieve the plastic deformation of the coating material necessary for the integral connection can be kept relatively short, which is of decisive importance with respect to the lowest possible thermal load on the carrier material and/or the coating material. Preferably, a linear pressure of at least 1.5 kN/mm is set in the nip of the first and/or in the nip of the second coating calander or in the nip of the only coating calander. Particularly preferably, the linear pressure is at least 2.5 kN/mm and very particularly preferably at least 3 kN/mm. Preferably, a linear pressure of 7 kN/mm is not exceeded.

The method according to the invention is thus above all also suitable for the production of composite materials with a large width. In a preferred embodiment of the method therefore the web-shaped carrier material is fed in a width in the range of 0.5 to 3.5 m and particularly preferably in a width of 1 to 3.2 m and coated by means of the calander roller arrangement over at least 95% of its width uniformly with the first and the second coating material.

Preferably, a relatively low temperature is used for the coating process. Low temperature hereby means that to avoid a thermal decomposition of the coating material, the temperature lies as little as possible above the softening temperature of the coating material, wherein the temperature is nevertheless selected to be high enough that the coating material becomes sufficiently viscous. The viscosity of the coating material must be low enough in order under pressure to be able to flow through the carrier material. Furthermore, with setting the temperature it must be taken into account that a homogenous melt and therefrom a homogenous web can actually be produced from the respective coating material. In an advantageous embodiment of the method, the first or the second coating material in the assembly of the first or second coating material with the web-shaped carrier material has a temperature that lies in the range of 20 to 150° C. and particularly preferably in the range between 30 and 110° C. above the softening temperature, wherein the temperature at the same time is below the decomposition temperature of the first or the second coating material. In the event of the preferred use of a first and/or a second coating material of a polyolefin homopolymer or a polyolefin copolymer, the temperature of the first or the second coating material during the calandering process is preferably between 140° C. and 220° C.

Preferably, the temperature of the calander rollers for applying the first or the second coating material onto the carrier material is also 20 to 150° C. and particularly preferably in the range between 30 and 110° C. above the softening temperature of the first or the second coating material, wherein the temperature at the same time is below the decomposition temperature of the first or the second coating material. The temperature of the calander rollers from experience is thereby to be adjusted to slightly different temperatures so that the product can be drawn off securely from the rollers. The melt of coating material can be transferred to the carrier material via calandering. The desired shape is fixed through subsequent immediate cooling of the coating carrier material. The method according to the invention provides the advantage that the carrier and coating materials used are exposed to a possibly necessary high temperature load only for a short time. Thus temperature-sensitive carrier materials can also be coated at comparatively high temperatures without a loss of the mechanical properties occurring in the coating method. For example, we refer to the coating of carrier materials of high-tenacity polyethylene yarns with polyolefin coating materials such as e.g., the above-referenced low-density polyethylene copolymer (plastomers). By means of the method according to the invention, for this material combination a composite material according to the invention can be produced with the use of melt roller calanders or coating calanders without a decrease in the mechanical properties, i.e., in particular the strength of the high-tenacity polyethylene yarn occurring. Other negative effects in the composite material obtained can also be avoided, such as, e.g., a fulling of the yarns of the carrier material, which leads to warping of the yarns and to shortening of the yarns or the width of the composite material.

Preferably, a material is used as a first and/or second coating material which has an MFR value (Melt Flow Rate) of approx. 2.16 kg/190° C. or 2.16 kg/230° C.

It is clear to a person skilled in the art that the flow behavior of the first and/or second coating material depends on different parameters, such as, for example, the temperature of the first and/or the second coating material and the pressure during the coating. Through the information that the first and/or the second coating material is to form links in the carrier material, however, it is clear to the person skilled in the art how he must select the corresponding parameters depending on the material to be used. It is clear that the first and/or the second coating material during the coating must have a viscosity that allows the first and/or the second coating material to flow through the carrier material in order to form links therein.

Preferably, the carrier material (composite material) coated on both sides or on one side after the coating is subjected to an embossing process. Thereby, for example, the carrier material coated on one side can firstly be subjected to an embossing process and then the side still uncoated can be coated. Optionally, the newly coated surface can subsequently likewise run through an embossing process. Alternatively to this, the carrier material, however, can also first be coated on both sides and subsequently can be embossed on one side or both sides in an embossing operation.

During the embossing operation, the warm or hot coating material applied to the carrier material is additionally pressed into the carrier material. To this end, the coating material is either heated again or the still warm (hot) coating material is pressed into the carrier material directly after the coating. Through the embossing process preferably the first coating material is intermixed with the second coating material. With the links thus produced, the first and/or the second coating material are not only in contact with one another, but the first and second coating material is—at least at the contact points—melted or intermixed with one another. Through the embossing process, consequently, the contact between the carrier layer and the coating layer is particularly integral, because the coating layer at least partially encloses the carrier layer.

The embossing operation preferably takes place under pressure and with heat. During the embossing operation, the temperature should be selected to be high enough that the coating material starts to melt slightly at least in the interior of the carrier material.

Here too it should therefore be clear that the temperature used and the pressure used are dependent on the first and second coating material. The temperature and the pressure must be selected accordingly depending on the material of the first and/or second coating material. Moreover, it is also clear that at higher temperatures the coating material can be embossed at lower pressures and vice versa. With respect to the temperatures to be preferably set thereby, in principle the statements already made regarding the temperatures during the coating apply in the same manner. Therefore the temperature during the embossing operation is also 20 to 150° C. and particularly preferably in the range between 30 and 110° C. above the softening temperature of the first or the second coating material, wherein the temperature at the same time is below the decomposition temperature of the first or the second coating material. In the case of the preferred use of a first and/or a second coating material of a polyolefin homopolymer or a polyolefin copolymer, the temperature of the first or of the second coating material during the calandering operation is preferably between 140° C. and 220° C.

Preferably, the embossing operation likewise takes place with a calander. The web-shaped carrier material after the coating with the first coating material and/or after the coating with the second coating material at increased temperature and under pressure is hereby guided through the nip of an embossing calander pair, whereby the further pressing in of the first or the second coating material into the carrier material is achieved. Preferably, the embossing calander pair thereby has the afore-mentioned temperatures. Preferably, a linear pressure of at least 1.5 kN/mm is also set in the nip of the embossing calander. Particularly preferably, the linear pressure is at least 2.5 kN/mm and very particularly preferably at last 3 kN/mm. Preferably, a linear pressure of 7 kN/mm is not exceeded. Polished, smooth and/or structured calander rollers can be used for the embossing calander. Preferably, a post-embossing operation can also be carried out after the embossing operation just described. The post-embossing operation can be a new embossing operation or an embossing operation with a different pressure, different temperatures, different dwell times and/or different rollers than with the embossing operation that previously took place. In the embossing operation, the polymers of the coating materials, if necessary, can be subjected to a cross linking, for example, through the suitable selection of the process conditions, such as temperature, pressure, tension and speed.

Through the method combination of melt roller calandering and embossing operation different types of carrier material and coating material can be combined and an important improvement in adhesion can be achieved. It is important thereby that a (melt roller) calandering and optionally an embossing is carried out and not a lamination, since the lamination contains the connection of film-like layers and carrier materials by means of adhesives. It is particularly advantageous that through the method according to the invention for producing the composite material a stabilization of the fabric matrix of weft and warp threads through the coating material is carried out. The low-viscosity melt is deposited between the intersection points (at openings) of the carrier material and thus prevents a shrinking/warping or creeping of the yarn material, in particular, e.g., when high-tenacity polyethylene yarns are used, such as e.g. Dyneema yarns. The carrier material is thus embedded and fixed through the coating materials.

The composite material preferably has a total weight of 200 g/m$^2$ to 2000 g/m$^2$. Furthermore preferably, the composite material preferably has a total thickness of 0.2 to 2 mm, wherein the coating thickness (on one side, that is, only the first or second coating layer) is preferably 0.1 to 2 mm. The adhesive strength of the composite material is preferably 10 to 70 N/cm. The adhesive strength of the coatings is hereby determined according to DIN EN ISO 2411:2000, wherein, in deviation from the standard the test specimens are not adhered to one another, but are connected to one another by means of hot air or by means of high-frequency welding.

If a woven fabric is used as the carrier material, the woven fabric thickness is preferably 0.1 to 1 mm. The woven fabric is preferably woven from a high-tenacity polyethylene yarn, wherein the yarn count is preferably 440 to 1670 dtex. As fabric weave, for example, gauze, linen weave, basket weave, twill weave or satin weave can be used. The tear resistance of the warp thread is preferably 2000-6000 N/50 mm (according to DIN 53354). The tear resistance of the weft thread is preferably 200-5500 N/50 mm (according to DIN 53363). The tear propagation resistance of the composite material in warp and in weft is 200 to 2000 N according to DIN 53363.

The invention is described in more detail below based on the examples and figures.

Figure 1:
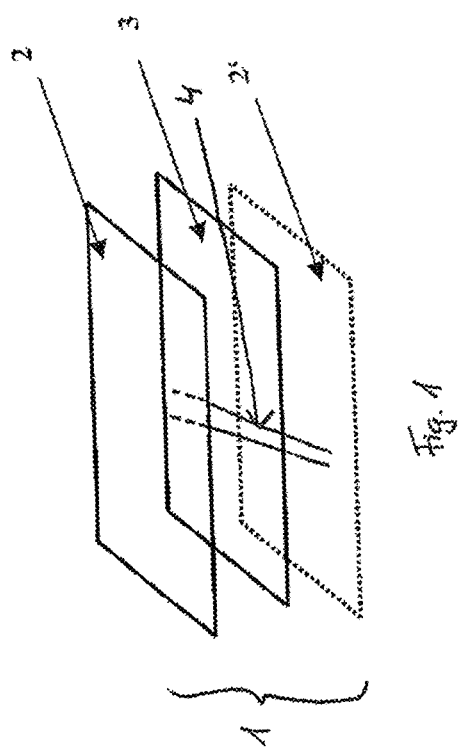
FIG. 1 Shows diagrammatically a composite material with two coating sides.

FIG. 1 shows diagrammatically a composite material 1, which in the example of FIG. 1 is composed of a first coating material 2, a second coating layer 2' of second coating material and a carrier material 3. The first coating layer 2 is connected via a link 4 to the second coating layer 2'. The link 4 is composed of the first and/or the second coating material and runs through the carrier material 3. The first and the second coating layer 2, 2' form a first and second surface of the composite material 1. 1 to 90% of the first and/or the second surface of the composite material have links 4, which preferably run from the first surface to the second surface of the carrier material 3. Preferably, at least 20% and up to 100% of these links 4 run from the first surface to the second surface, so that the two surfaces are connected to one another by the links 4, as also shown in FIG. 1. Particularly preferably, at least 50% and up to 70% and very particularly preferably at least 80% and up to 90% of the links 4 run from the first surface up to the second surface so that a continuous connection between the first coating material 2 and the second coating material 2' is produced.

Figure 2:
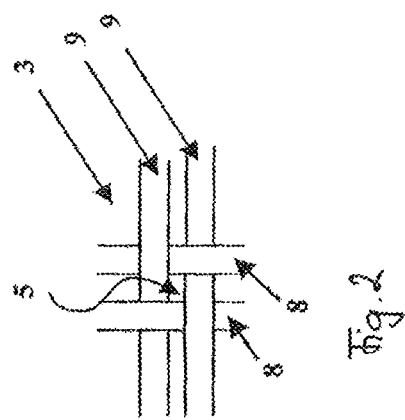
FIG. 2 Shows diagrammatically a woven fabric as a carrier material.

FIG. 2 shows a woven fabric 3 as carrier material 3. The woven fabric 3 has warp threads 8 and weft threads 9 in a linen weave. Between the intersection points of the warp threads and weft threads the woven fabric 3 has openings 5, which are regularly or uniformly distributed over the surface of the fabric and depend in their frequency from the type of weave and the number of threads per centimeter. In the production of the composite material, for example, a fabric 3 as shown in FIG. 2, is coated with a melt roller calandering firstly on the first surface and subsequently on the second surface of the fabric 3 as carrier material 3 with a first and a second coating material so that a first coating layer 2 and a second coating layer 2' are formed. Already with the melt roller calandering (or also only with a calandering) the first and/or the second coating material reaches the openings 5, so that links 4 are embodied. When starting from each top side of the carrier material 3, coating material in the form of melt reaches the openings 5 during the calandering, either a continuous link 4—as shown in FIG. 1—is formed or two links are formed, which extend from each top side of the fabric 3 into the fabric 3. The formation of continuous links 4 is preferred. The coated fabric 3 can be subjected to an embossing operation preferably after the coating on both sides. With this embossing operation, the coated fabric 3 is, e.g., again heated so that the links of coating material and the coating layer 2 at least in part melt again. Under pressure, the coating material is then again pressed into the fabric 3 as carrier material. Instead of an embossing operation after a new melting of course it is also possible that after the coating on both sides the composite material directly after leaving the coating calander and before cooling of the composite material is subjected to an embossing operation. Since the links 4 in the interior of the carrier material 3 are likewise melted at least in part, the coating materials of the first top side of the carrier material and the second top side of the carrier material mix in the interior of the links 4. Therefore even if during the calandering only links 4 are formed which do not extend to the opposite top side of the carrier material 3, through a subsequent embossing operation the formation of continuous links 4, as shown in FIG. 1, but at least a greater partial encasing of e.g. yarns of the carrier material can be achieved.

Figure 3:
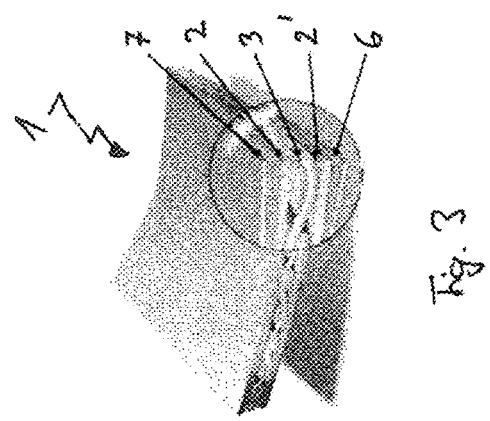
FIG. 3 Shows diagrammatically a composite material.

FIG. 3 shows diagrammatically the layer structure of a composite material 1 graphically. The composite material 1 has in the example as a core a woven fabric 3 as carrier material 3. The carrier material 3 is coated on both sides. On a first top side, the carrier material 3 therefore has a full-surface coating layer 2 of a first coating material. On a second top side of the carrier material 3, the carrier material 3 has a full-surface coating layer 2' of a second coating material. The first and the second coating layer 2, 2' optionally have respectively a protective layer 6 and 7. The protective layers 6, 7 can be, for example, varnish layers which are designed to protect the composite material 1 from dirt, moisture and/or insecticidal attack or fungal attack. The first coating layer 2 and the second coating layer 2' can be made from the same coating material. Likewise, the first protective layer 7 and the second protective layer 6 can also be of the same protective material. The composite material 1 can be used, for example, for textile architecture, textile building, for food containers, use containers, roofing and as material in the aerospace industry.

Figure 4:
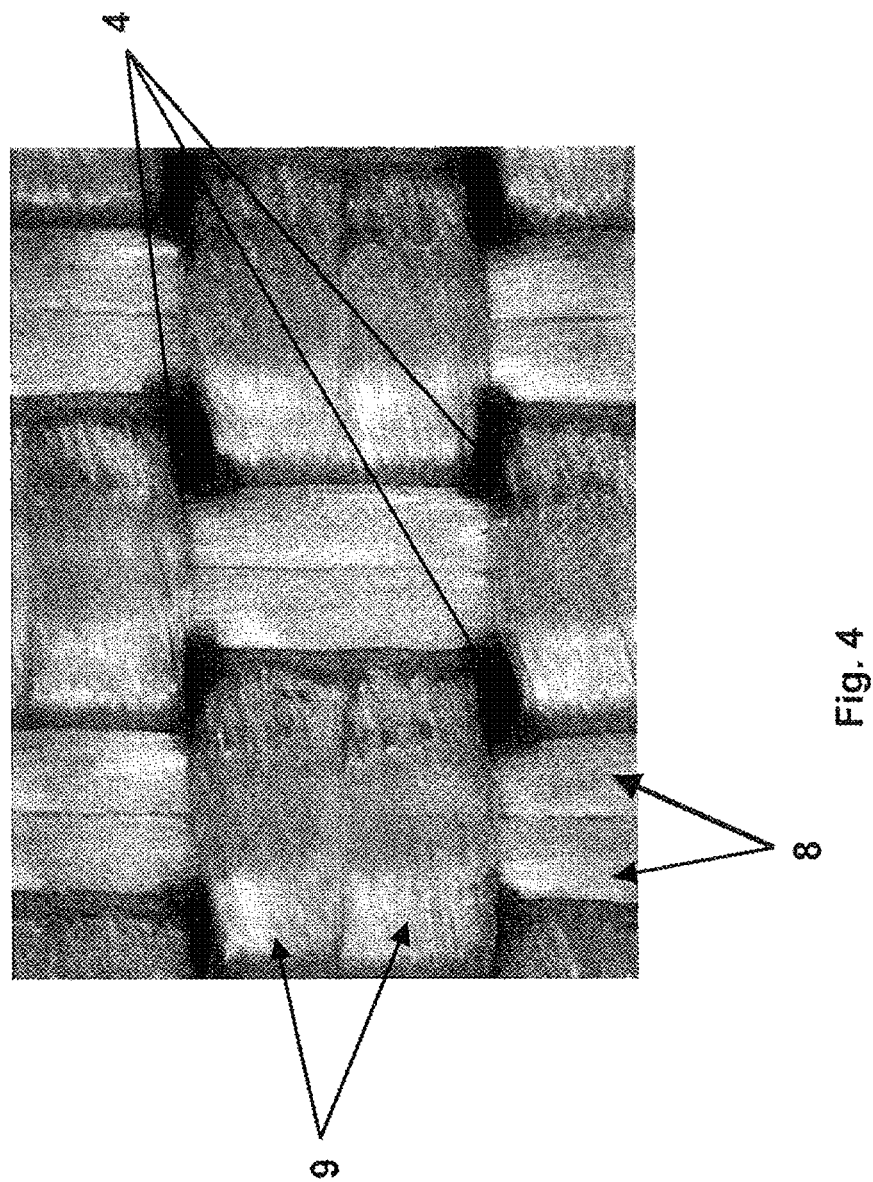
FIG. 4 Shows a microscope image of a section of a carrier material coated on one side.
Figure 5:
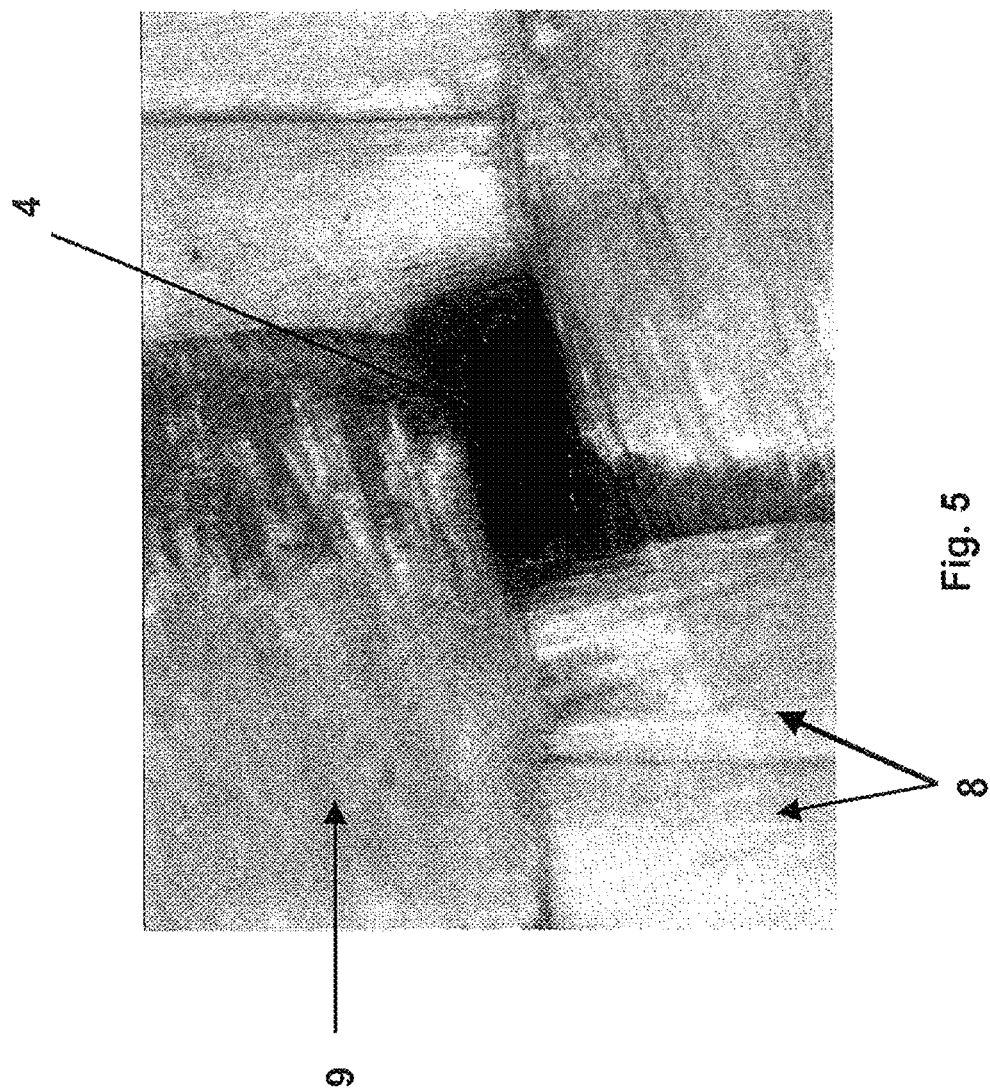
FIG. 5 Shows a microscope image of a section of a carrier material coated on one side.

FIG. 4 and FIG. 5 respectively show an optical microscope image of a carrier material 3 coated on one side after the application of the first coating material. The images show the still uncoated side of the carrier material 3. Between the warp threads 8 and the weft threads 9 of the carrier material 3 (in the example a woven fabric) openings 5 are discernible, which are filled with coating material, wherein the coating material in part also penetrates into the spaces between the warp threads 8 and the weft threads 9 of the woven fabric and ensure a partial enveloping of the threads. The coating material penetrating the openings 5 forms a link 4, wherein the link 4 extends from the coating layer of the first surface of the carrier material 3 lying behind the observation plane up to the not yet coated second surface of the carrier material 3 shown. The coating material in the opening 5, which forms the link, lies in this case approximately in the same plane as the surfaces of the warp threads 8 and the weft threads 9 in the surface side of the carrier material 3 shown. In a subsequent coating of the second surface of the carrier material 3 (which cannot be seen) the coating material links 4 can then come into contact with links 4 starting from the coating of the second surface of the carrier material 3, and the coating material of the first surface of the carrier material can thus form the continuous links 4 with the coating material of the second surface, for example, by melting, intermixing or mixing.

Figure 6:
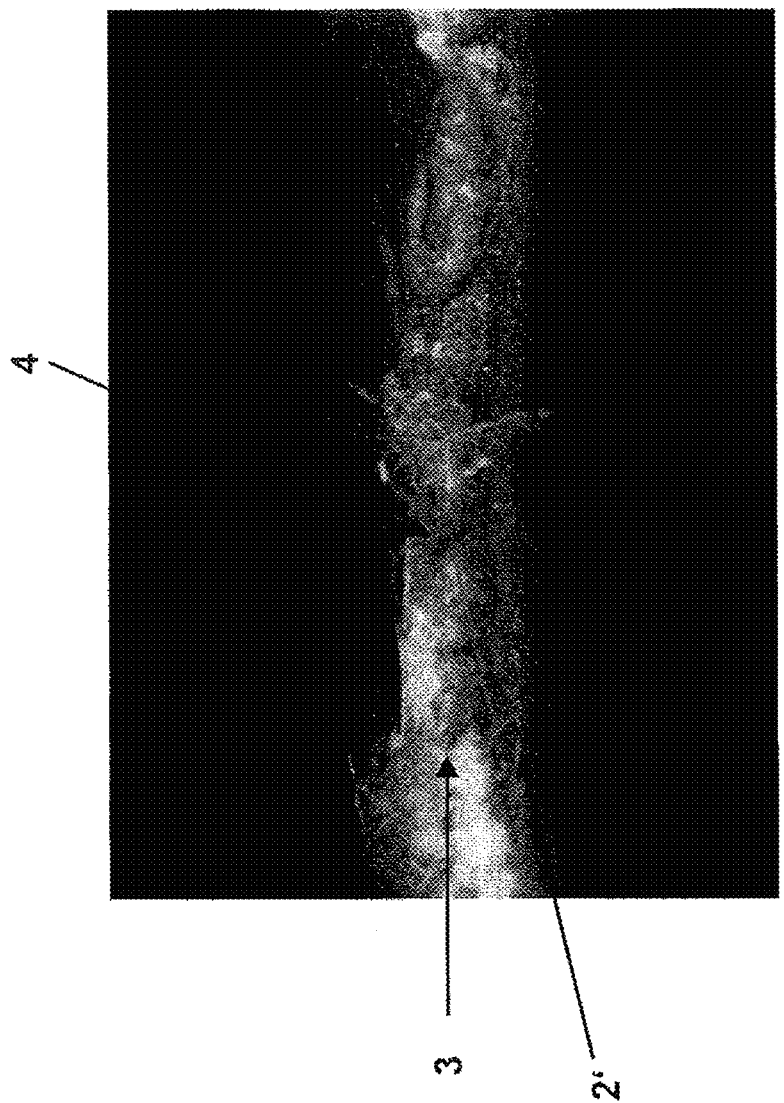
FIG. 6 Shows a microscope image of a section of a carrier material coated on one side in side view.
Figure 7:
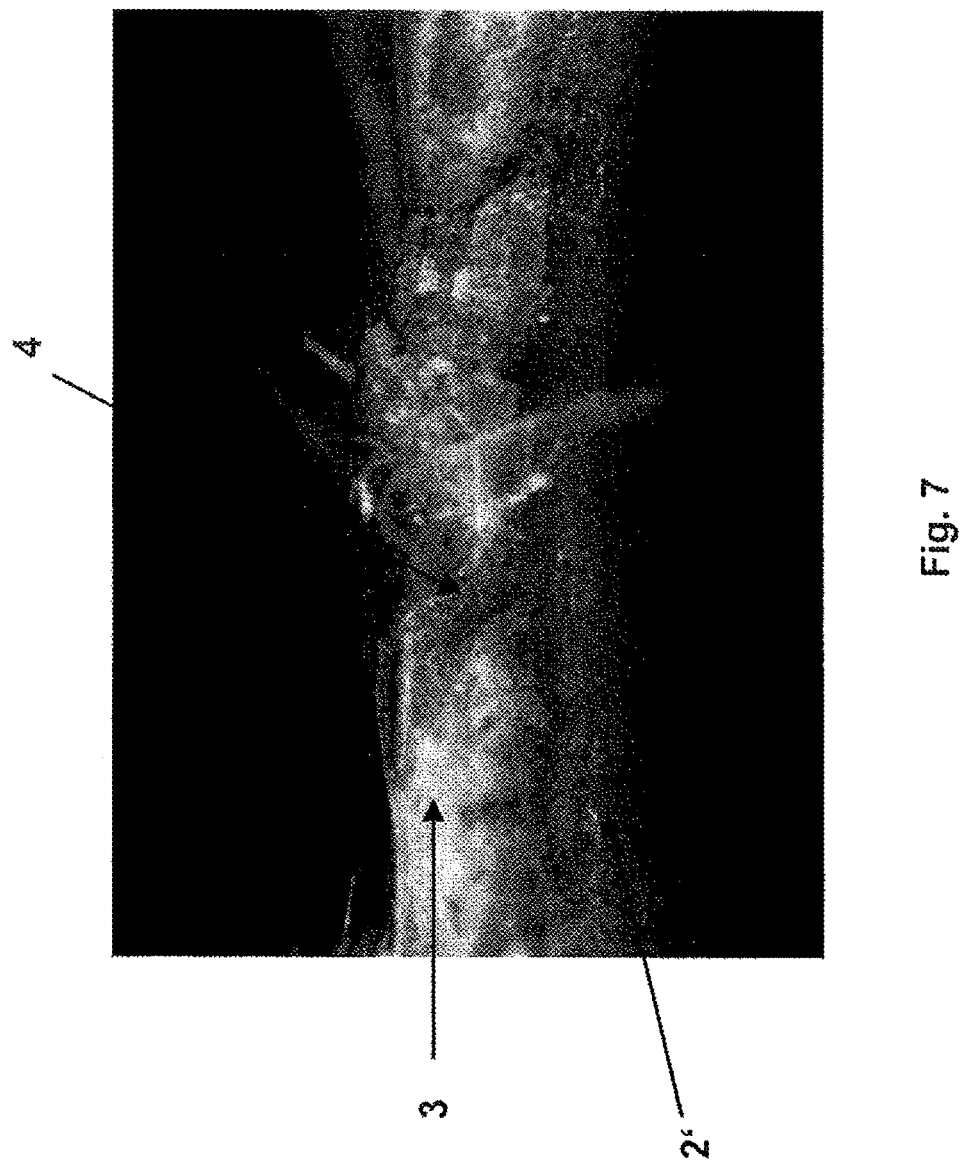
FIG. 7 Shows a microscope image of a section of a carrier material coated on one side in side view.

FIGS. 6 and 7 respectively show a side view of a carrier material 3 coated on one side. A coating layer 2' of coating material has been applied on a (second) surface of the carrier material 3 essentially over the entire surface by means of a melt roller calander. The coating material has thereby been pressed into openings 5 of the carrier material 3 during the coating operation so that this coating material reaches through the carrier material 3 to the (first) surface of the carrier material 3. The coating material that has passed though the carrier material 3 forms a link 4 inside the carrier material 3. In FIGS. 6 and 7 the coating material has essentially been pressed completely through the carrier material during the coating 1. "Pressed through" means in this context that the coating material is pressed essentially perpendicular to the main extension plane of the coating layer through the carrier material 3 in the direction of the other surface of the carrier material 3. In contrast to FIGS. 6 and 7, the coating material however can also be pressed only half or three quarters through the carrier material 3. Of course, in a coating operation the coating material can also be pressed at various points of the carrier material 3 also at different depths thereinto. For example, 80% of the links 4 can be pressed essentially completely through the carrier material 3 and 20% of the links 4 half way through the carrier material 3. in another example at least 60%, preferably at least 80% and very particularly preferably at least 90% of these links 4 can be pressed essentially completely through the carrier material 3.

Preferably, the carrier material is composed of a woven fabric of a high-tenacity polyethylene yarn (e.g., Dyneema from DSM B.V.) and the first and/or the second coating material is preferably made from a metallocene plastomer. Through the links of coating material, which run inside the carrier material, the cited fabric can be advantageously kept stable in length and width, because a crimping of the fabric is avoided due to the links. Furthermore advantageously, the fabric of high-tenacity polyethylene yarn can be easily coated due to the presence of the links, since the links engage in the carrier material or the two coating layers are connected by the links to one another and the carrier material is "sandwiched." With a curtain, for example, which was woven from high-tenacity polyethylene yarn and which was coated with a polyolefin such as, e.g., the above mentioned low-density polyethylene copolymers produced by means of metallocene catalysts, the curtain, even after the curtain has been used several times (for example, moving the curtain to release an opening and closing it again), the same length of the curtain and the same width of the curtain can be measured.

Example 1

A fabric web with a width of 3.2 m was furnished as a carrier material. The fabric was a polyester fabric (PES fabric) with an open linen weave in the form of an open lattice construction and a fabric construction of 4.3/4.3 thread/cm. The yarns (Diolen®, Polyester High Performance) forming the thread had a thread count of 1100 dtex and a yarn twist of Z60/60. The fabric had a weight per unit area of 108 $g/m^2$.

A polypropylene (Hilfax, type CA 10A, Basell) was used as a coating material with which the PES fabric was coated. Both surfaces of the fabric were coated with this coating material.

For preheating, the fabric web was preheated over several heated rollers (T=120° C.) and subsequently continuously guided between the rollers of a coating calander and there coated with the coating material. The coating material in the molten state at a temperature of 185° C. on the side of the first surface of the fabric was thereby conveyed via an extruder into the nip of the coating calander and there shaped to form a web. The rollers of the calander were heated to a temperature of 145° C. or 165° C. The linear pressure in the nip of the coating calander was set to approx. 3.5 kN/mm. While running the fabric and coating material through the nip of the coating calander, the fabric was coated on its first surface with the web of the polypropylene coating material, wherein at the same time the coating material was pressed into the fabric structure. The coating layers had in each case a weight per unit area of 545 $g/m^2$, so that a total weight of the resulting composite material of approx. 1200 $g/m^2$ resulted.

After the cooling of the carrier material coated on one side, this was again fed to the process and coated on its second side with the PP coating material while being guided through the nip of the coating calander according to the method described above. The coating layers had in each case a weight per unit area of 545 $g/m^2$ so that a total weight of the resulting composite material of approx. 1200 $g/m^2$ resulted.

Subsequently, the fabric coated on both sides was subjected to an embossing operation. To this end, the coated fabric was guided through the nip of an embossing calander under a linear pressure of approx. 2.3 kN/mm, the rollers of which had a temperature of approx. 150° C. An improvement of the bond was achieved through the embossing operation following the coating operation.

To judge the quality of the connection between the carrier material and coating, the adhesive strength of the composite material was tested. The composite material obtained after coating in the coating calander and embossing in the embossing calander had a high adhesive strength that was greater than 25 N/cm.

Example 2

The procedure was as in Example 1. Deviating from Example 1, a polyester fabric with a width of 80 cm and a weight per unit area of 188 $g/m^2$ was used as carrier material. The web of this fabric was preheated to 70° C. over several heated rollers and continuously fed to the coating calander.

A polyethylene copolymerisate (Exact Plastomer 8210, Dexplastomers) was used as coating material, which contained flame retardant as an additive. The coating material was fed into the nip of the coating calander at a temperature of 155° C., shaped to form a web there and respectively one of the surfaces of the PES fabric was coated therewith. The rollers of the coating calander had a temperature of 170° C. or 180° C. The linear pressure in the nip of the coating calander during the application of the coating to the first side of the carrier material was 2.8 kN/mm and during the application of the coating on the second side of the carrier material 5.5 kN/mm. The coating layers had a weight per unit area of 272 $g/m^2$ and of 220 $g/m^2$ so that a total weight of the resulting composite material of approx. 680 $g/m^2$ resulted.

Following the coating, the coated carrier material was subjected to an embossing operation. To this end, the coated fabric was guided through an embossing calander under a linear pressure of 5.5 kN/mm, the rollers of which had a temperature of approx. 170° C.

The composite material obtained after coating in the coating calander and embossing in the embossing calander had an adhesive strength of more than 25 N/cm.

Example 3

The procedure was as in Example 1. Deviating from Example 1, a fabric of high-tenacity polyethylene yarns (type Dyneema® SK65, DSM Dyneema B.V.) was used as a carrier material with a P2/2 basket weave, a fabric construction of 6.0/6.0 thread/cm and a weight per unit area of 105 $g/m^2$. The fabric had a width of 80 cm. The polyethylene yarns had a thread count of 880 dtex and a yarn twist of 100 S/100 S. The web of this fabric was preheated via several heated rollers to 40° C. and continuously fed to the coating calander.

As a coating material the polyethylene copolymerisate from Example 3 was used (Exact Plastomer 8210, Dexplastomers), which was provided with a flame retardant. The coating material was fed into the nip of the coating calander at a temperature of 180° C., shaped there to form a web and s respectively one of the surfaces of the PES fabric was coated therewith. The rollers of the coating calander were heated to a temperature of 170° C. or 180° C. The linear pressure in the nip of the coating calander during the application on the first side of the carrier material was 3.2 kN/mm and during the application on the second side of the carrier material was 5.5 kN/mm. The coating layers had a weight per unit area of 395 $g/m^2$ and of 400 $g/m^2$ so that a total weight of the resulting composite material of 900 $g/m^2$ resulted.

The coating was followed by an embossing operation in which the coated carrier material was guided through an embossing calander under pressure and at increased temperature. The linear pressure in the embossing calandar was 5.5 kN/mm the rollers of the embossing calander had a temperature of approx. 170° C.

The composite material obtained after coating in the coating calander and embossing in the embossing calander had an adhesive strength of more than 25 N/cm.

Example 4

The procedure was as in Example 3. Deviating from Example 4, as carrier material a fabric of high-tenacity polyethylene yarns (type Dyneema® SK65, DSM Dyneema B.V.) with a width of 80 cm and a weight per unit area of 193 g/m² was used. The web of this fabric was preheated to 90° C. over several heated rollers and continuously fed to the coating calander.

As coating material the polyethylene copolymerisate Exact Plastomer 0203 (Dexplastomers) was used, which likewise was provided with a flame retardant. The coating material was fed into the nip of the coating calander at a temperature of 155° C., there shaped to form a web and respectively one of the surfaces of the PES fabric was coated therewith. The rollers of the coating calander were heated to a temperature of 117° C. or 127° C. The linear pressure in the nip of the coating calander was approx. 3.2 kN/mm. The coating layers had a weight per unit area of 150 g/m² and of 187 g/m² so that a total weight of the resulting composite material of 530 g/m² resulted.

The coating was followed by an embossing operation in which the coated carrier material was guided through an embossing calander under pressure and at increased temperature. The pressure in the embossing calander was also approx. 3.2 kN/mm, the rollers of the embossing calander had a temperature of approx. 120° C. The composite material obtained after the coating in the coating calander and embossing in the embossing calander had an adhesive strength of approx. 20 N/cm.

REFERENCE NUMBERS

1 Composite material
2 First coating layer
2' Second coating layer
3 Carrier material
4 Link
5 Opening
6 Second protective layer
7 First protective layer
8 Warp threads of the carrier material 3
9 Weft threads of the carrier material 3

The invention claimed is:

1. A composite material comprising a carrier material, wherein:
   the carrier material is coated on a first surface with a first coating material and on a second surface with a second coating material,
   the composite material has links of coating material which run from the first surface of the carrier material to the second surface of the carrier material,
   a starting area of the links, which starts from the first surface of the carrier material, accounts for 1% to 70% of the area of the first surface, and
   45 to 95% of the first surface of the carrier material is coated by the first coating material, and/or 45 to 95% of the second surface of the carrier material is coated by the second coating material.

2. The composite material according to claim 1, wherein the carrier material comprises at least one woven fabric, a knitted fabric, a gauze, a lattice, or a non-woven fabric.

3. The composite material according to claim 1, wherein the first coating material and the second coating material are the same material.

4. The composite material according to claim 1, wherein the links comprise coating material at openings in the carrier material.

5. The composite material according to claim 1, wherein the carrier material has fibers of polyethylene.

6. The composite material according to claim 1, wherein the first and/or the second coating material comprises a polyolefin homopolymer or a polyolefin copolymer.

7. A container comprising the composite material of claim 1.

8. An oil barrier comprising the composite material of claim 1.

9. A textile construction material comprising the composite material of claim 1.

10. An industrial material comprising the composite material of claim 1.

11. The composite material according to claim 1, wherein the starting area of the links accounts for 1% to 50% of the area of the first surface.

12. The composite material according to claim 1, wherein the starting area of the links accounts for 1% to 40% of the area of the first surface.

13. The composite material according to claim 1, wherein the carrier material is coated on the first surface with a web of the first coating material and on the second surface with a web of the second coating material.

14. The composite material according to claim 1, wherein 45 to 90% of the first surface of the carrier material is coated by the first coating material, and/or 45 to 90% of the second surface of the carrier material is coated by the second coating material.

15. The composite material according to claim 1, wherein the composite material is substantially free of an adhesive.

* * * * *